United States Patent [19]
Yanagihara et al.

[11] Patent Number: 5,745,644
[45] Date of Patent: Apr. 28, 1998

[54] METHOD AND APPARATUS FOR ENCODING A DIGITAL VIDEO SIGNAL

[75] Inventors: Naofumi Yanagihara; Masaki Oguro, both of Tokyo, Japan

[73] Assignee: Sony Corporation, Tokyo, Japan

[21] Appl. No.: 967,015

[22] Filed: Oct. 27, 1992

[30] Foreign Application Priority Data

Nov. 5, 1991 [JP] Japan ............................. 3-317498

[51] Int. Cl.$^6$ ........................... H04N 5/917; H04N 11/02
[52] U.S. Cl. ........................................ 386/109; 386/33
[58] Field of Search .................... 358/310, 335, 358/133, 426, 430, 432, 433; 360/32, 33.1, 48; 348/384, 394, 395, 405, 409, 410, 418, 420; 386/109, 111, 112, 33, 27, 34; H04N 5/917, 7/26, 11/02

[56] References Cited

U.S. PATENT DOCUMENTS

| | | | |
|---|---|---|---|
| 4,862,295 | 8/1989 | Tanaka et al. | 360/48 |
| 5,023,710 | 6/1991 | Kondo et al. | |
| 5,045,925 | 9/1991 | Saito | 358/13 |
| 5,045,938 | 9/1991 | Sugiyama | 358/133 |
| 5,047,852 | 9/1991 | Hanyu et al. | 358/133 |
| 5,068,744 | 11/1991 | Ito | 358/310 |
| 5,148,272 | 9/1992 | Acampora et al. | 358/133 |
| 5,150,208 | 9/1992 | Otaka et al. | 358/133 |
| 5,239,308 | 8/1993 | Keesen | 741/67 |
| 5,253,122 | 10/1993 | Chiba et al. | 360/33.1 |
| 5,329,375 | 7/1994 | Juri et al. | 358/743 |

FOREIGN PATENT DOCUMENTS

| | | |
|---|---|---|
| 0 448 491 | 9/1991 | European Pat. Off. |
| 0 501 755 | 9/1992 | European Pat. Off. |
| 2 198274 | 8/1990 | Japan |
| WO 91/02430 | 2/1991 | WIPO |
| WO 92/16071 | 9/1992 | WIPO |

OTHER PUBLICATIONS

IEEE Transactions on Consumer Electronics vol. 37, No. 3, Aug. 1991, New York pp. 275–282 XP263196 M. Yoneda et al. 'An experimental digital VCR with new DCT–based bit–rate reduction system'.

*Primary Examiner*—Robert Chevalier
*Attorney, Agent, or Firm*—William S. Frommer; Alvin Sinderbrand

[57] ABSTRACT

Methods and apparatus are provided for encoding a digital video signal provided as a plurality of blocks of video data. The video data in block form are subjected to discrete cosine transformation to yield respective DC components and respective pluralities of AC components. The plurality of AC components are variable length encoded and, in certain embodiments, the DC components and variable-length encoded AC components of each block are arranged in a data stream so that the DC components precede the variable-length encoded AC components and relatively lower frequency variable length encoded AC components precede relatively higher frequency ones thereof. Error correction codes for the transformed data also are supplied. In certain embodiments of the invention, the transformed video data are arranged as a sequence of fixed length symbols so that the beginning of each of a plurality of blocks of transformed data corresponds with the beginning of a respective symbol within the sequence. In addition, an address indicating the position of a subsequent block is included within the sequence in association with a preceding block.

30 Claims, 11 Drawing Sheets

( 1 BLOCK )

| 139. | 144. | 149. | 153. | 155. | 155. | 155. | 155. |
| 144. | 151. | 153. | 156. | 159. | 156. | 156. | 156. |
| 150. | 155. | 160. | 163. | 158. | 156. | 156. | 156. |
| 159. | 161. | 162. | 160. | 160. | 159. | 159. | 159. |
| 159. | 160. | 161. | 162. | 162. | 155. | 155. | 155. |
| 161. | 161. | 161. | 161. | 160. | 157. | 157. | 157. |
| 162. | 162. | 161. | 163. | 162. | 157. | 157. | 157. |
| 162. | 162. | 161. | 161. | 163. | 158. | 158. | 158. |

| AREA / Q No. | 0 | 1 | 2 | 3 | 4 | 5 | 6 | ... | 11 | 12 | 13 | 14 | 15 |
|---|---|---|---|---|---|---|---|---|---|---|---|---|---|
| 0 | 2 | 2 | 2 | 4 | 4 | 4 | 6 | | 10 | 16 | 16 | 16 | 16 |
| 1 | 2 | 2 | 2 | 4 | 4 | 4 | 6 | | 10 | 16 | 16 | 16 | 32 |
| 2 | 2 | 2 | 2 | 4 | 6 | 6 | 6 | | 10 | 16 | 16 | 16 | 32 |
| 3 | 2 | 4 | 4 | 4 | 6 | 6 | 8 | | 10 | 16 | 16 | 16 | 32 |
| 4 | 4 | 4 | 4 | 4 | 6 | 6 | 8 | | 10 | 16 | 16 | 16 | 32 |
| ⋮ | | | | | | | | | | | | | |
| 29 | 12 | 14 | 14 | 16 | 20 | 20 | 24 | | 48 | 48 | 48 | 64 | 64 |
| 30 | 12 | 14 | 14 | 16 | 24 | 24 | 24 | | 48 | 64 | 64 | 64 | 64 |
| 31 | 14 | 16 | 16 | 16 | 24 | 24 | 32 | | 48 | 64 | 64 | 64 | 64 |

Fig. 10

HORIZONTAL →

VERTICAL ↓

| 0 | 2 | 6 | 12 |
|---|---|---|---|
| 1 | 7 | 10 | 13 |
| 4 | 9 | 11 | 14 |
| 3 | 5 | 8 | 15 |

Fig.11

| 265 | -113 | 20  | 12 | -11 | 4 | 2 | 1  |
|-----|------|-----|----|-----|---|---|----|
| -29 | 38   | -28 | 16 | -7  | 2 | 2 | -1 |
| 39  | -40  | 15  | 4  | -9  | 4 | 0 | 0  |
| 11  | -10  | -2  | 9  | -6  | 2 | 2 | -1 |
| 0   | 2    | -3  | 2  | -3  | 1 | 0 | 1  |
| 9   | -12  | 4   | 3  | -4  | 2 | 0 | -1 |
| 1   | 1    | -1  | 0  | 0   | 0 | 1 | -1 |
| 1   | -2   | 0   | 2  | -2  | 2 | 0 | 0  |

Fig. 12

| area:  | 0 | 1 | 2 | 3 | ... | 12 | 13 | 14 | 15 |
|--------|---|---|---|---|-----|----|----|----|----|
| Q No.9 | 6 | 8 | 8 | 8 | 8   | 20 | 20 | 20 | 64 |

Fig. 13

|   | 0 | 1 | 2 | 3 | ④ | 5 | 6 | 7 |
|---|---|---|---|---|---|---|---|---|
| 0 | 265 | -19 | 3 | 2 | -1 | 0 | 0 | 0 |
| 1 | -5 | 6 | -4 | 2 | -1 | 0 | 0 | 0 |
| 2 | 5 | -5 | 2 | 1 | -1 | 0 | 0 | 0 |
| 3 | 1 | -1 | 0 | 1 | -1 | 0 | 0 | 0 |
| 4 | 0 | 0 | 0 | 0 | 0 | 0 | 0 | 0 |
| ⑤ | 1 | -2 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

Fig. 14

| AC COEFFICIENTS | CODE | BIT LENGTH |
|---|---|---|
| 0 | 0 | 1 |
| ±1 | 10× | 3 |
| ±2,±3 | 110×× | 5 |
| ±4 ~ ±7 | 1110××× | 7 |
| ±8 ~ ±15 | 11110×××× | 9 |
| ⋮ | ⋮ | ⋮ |

Fig. 15

| 9 | 11 | 5 | 5 | 3 |   |   |   |
|---|---|---|---|---|---|---|---|
| 7 | 7 | 7 | 5 | 3 |   |   |   |
| 7 | 7 | 5 | 3 | 3 |   |   |   |
| 3 | 3 | 1 | 3 | 3 |   |   |   |
| 1 | 1 | 1 | 1 | 1 |   |   |   |
| 3 | 5 | 1 | 1 | 1 |   |   |   |
|   |   |   |   |   |   |   |   |
|   |   |   |   |   |   |   |   |

METHOD AND APPARATUS FOR ENCODING A DIGITAL VIDEO SIGNAL

BACKGROUND OF THE INVENTION

The present invention relates to methods and apparatus for encoding digital video signals with high efficiency, including methods and apparatus for encoding digital video signals by means of discrete cosine transformation (DCT) for recording by a digital VTR.

Digital VTR's serve both to digitize a video signal and record the digitized signal on magnetic tape. The bandwidth of the digital video signal as sampled exceeds the practical recording capacity of the magnetic tape. Accordingly, it is impractical to record the digital video signal as sampled, so that the signal is first encoded by a highly efficient encoding process prior to recording.

It has been proposed to employ discrete cosine transformation in carrying out such a highly efficient encoding process for digital video signals to be recorded by a digital VTR. In the discrete cosine transformation process, the digital video data are first arranged in predetermined blocks. For example, such blocks can be composed of eight-by-eight picture elements or pixels in the time domain. The predetermined digital video blocks are transformed into frequency domain data by means of the discrete cosine transformation process.

The video signals possess correlation, so that upon transformation into the frequency domain, the resulting DC components are predominant. Moreover, the frequency components produced by the discrete cosine transformation typically have their greatest power levels at the lowest frequencies and, as the frequencies of the components increase, the power levels of the components generally decrease.

Once the discrete cosine transformation has been carried out, the frequency domain data is then encoded in a variable length code format, such as Huffman codes or the like. This serves to decrease the number of bits required to represent the transformed data.

Where the data is to be recorded on magnetic tape, an error correction coding process using Reed Solomon codes typically is carried out. Error detection and correction with the use of Reed Solomon codes is carried out on a symbol-by-symbol basis, each symbol normally including eight bits. However, the variable length encoded data do not have a fixed length, so that a plurality of the variable length encoded components might be allocated to a single symbol or else might be allocated over two or more symbols. Accordingly, should an uncorrectable error occur in any given symbol, it is no longer possible to determine the points at which the variable length codes in the following symbols begin. Thus, when such an error takes place in a given symbol, even if all of the following symbols are themselves free of error, none of the data they contain can be reproduced.

It is, of course, possible to avoid the loss of the data following the symbol containing the error by placing the beginning of each variable length encoded component at the beginning of each symbol. This, however, would eliminate the data compression achieved with the use of the variable length encoding process, so that the resulting data would be useless.

OBJECTS AND SUMMARY OF THE INVENTION

Accordingly, it is an object of the present invention to provide methods and apparatus for encoding a digital video signal which substantially alleviate or overcome the above-mentioned disadvantages and problems associated with the prior art.

Another object of the present invention is to provide methods and apparatus for encoding a digital video signal which employ a transformation of the signal from the time domain to the frequency domain as well as variable-length encoding of the frequency domain information such that an uncorrectable error in the variable-length encoded signal results in a minimal loss of information.

In accordance with one aspect of the present invention, a method of and an apparatus for encoding a digital video signal provided as a plurality of blocks of video data, comprise the steps of and the means for, respectively: performing a discrete cosine transformation of each of the plurality of blocks of video data to provide a plurality of corresponding blocks of transformed video data, each of the plurality of corresponding blocks of transformed video data including a respective DC component and a respective plurality of AC components; variable-length encoding the respective plurality of AC components of each of the plurality of corresponding blocks of transformed video data; arranging the respective DC component and the respective variable-length encoded AC components of each of the plurality of corresponding blocks of transformed video data in an order such that the respective DC component precedes the respective variable-length encoded AC components and relatively lower frequency ones of the respective variable-length encoded AC components precede relatively higher frequency ones of the respective variable-length encoded AC components; and providing error correction codes for the plurality of corresponding blocks of transformed video data.

The discrete cosine transformation of a digital video signal typically yields a predominant DC component due to the correlation of the video signal, together with AC components whose power levels are typically highest at low frequencies, diminishing substantially with increasing frequency.

Accordingly, the DC component and lower frequency AC components are relatively much more important than higher frequency components. By arranging the transformed signals in such a way that the DC component and the lower frequency components precede higher frequency components, the occurrence of an uncorrectable error in one byte resulting in an inability to reproduce the following signals, is less likely to result in a serious loss of information.

In accordance with a further aspect of the present invention, a method of and apparatus for encoding a digital video signal provided as a plurality of blocks of video data, comprises the steps of and the means for, respectively: performing a discrete cosine transformation of each of the plurality of blocks of video data to provide a plurality of corresponding blocks of transformed video data each including a plurality of frequency domain components; variable-length encoding at least some of the plurality of frequency domain components of each of the plurality of corresponding blocks of transformed video data to form a plurality of corresponding variable-length encoded frequency domain components; arranging the plurality of corresponding blocks of transformed video data as a sequence of fixed length symbols such that respective beginnings of at least some of the plurality of corresponding blocks of transformed video data each corresponds with the beginning of a respective symbol within the sequence of fixed length symbols; including an address within the sequence of fixed length symbols positioned in association with one of the plurality of corresponding blocks of transformed video data, the address indicating a position of one of said at least some of the plurality of corresponding blocks of transformed video data within the sequence of fixed length symbols following that one of the plurality of corresponding blocks of transformed video data with which the location of the address is associated; and providing error correction codes within the sequence of fixed length symbols for the plurality of corresponding blocks of transformed video data. Since the beginning of a block of transformed video data corresponds with the beginning of a respective symbol, an uncorrectable error in a preceding block will not affect the reproduceability of the block that begins with the symbol.

The above, and other objects, features and advantageous of the present invention, will be apparent in the following detailed description of an advantageous embodiment thereof which is to be read in connection with the accompanying drawings forming a part hereof, and wherein corresponding parts and components are identified by the same reference numerals in the several views of the drawings.

DETAILED DESCRIPTION OF AN ADVANTAGEOUS EMBODIMENT

Figure 1:
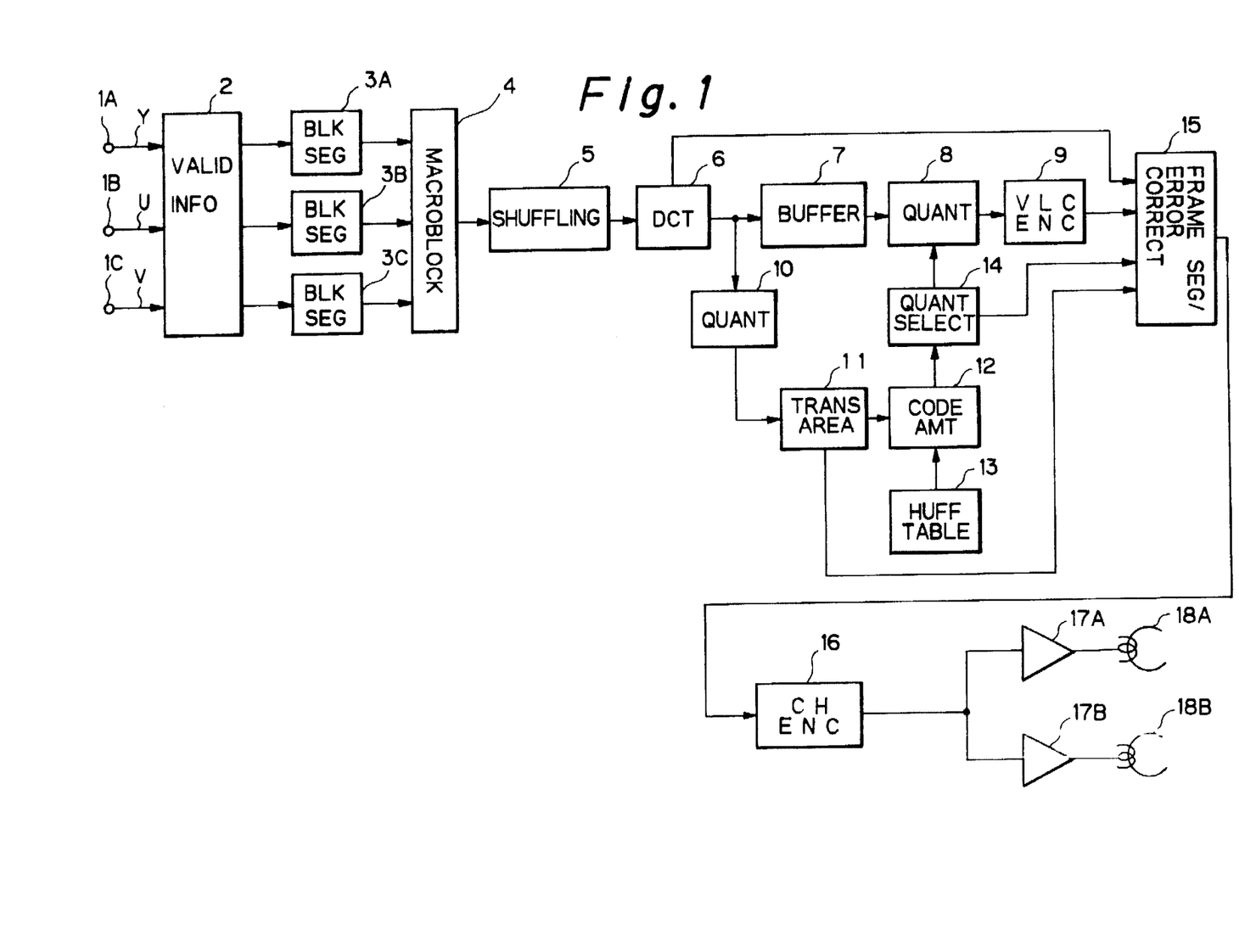
FIG. 1 is a block diagram of the recording system of a digital VTR in accordance with an embodiment of the present invention.

Referring to the drawings in detail, and presently to FIG. 1 thereof, the recording system of a digital VTR in accordance with an advantageous embodiment of the present invention is illustrated therein. The recording system of FIG. 1 is provided with input terminals 1A, 1B and 1C to receive, respectively, a digital luminance signal Y and digital color difference signals U and V which conform, for example, to the NTSC system. The digital luminance signal Y and digital color difference signals U and V are (4:2:2) component signals so that the digital luminance signal Y has a sampling frequency of 13.5 MHz, the color difference signals U and V each have a sampling frequency of 6.75 MHz, and the data is quantized with eight bits per sample.

Figure 2:
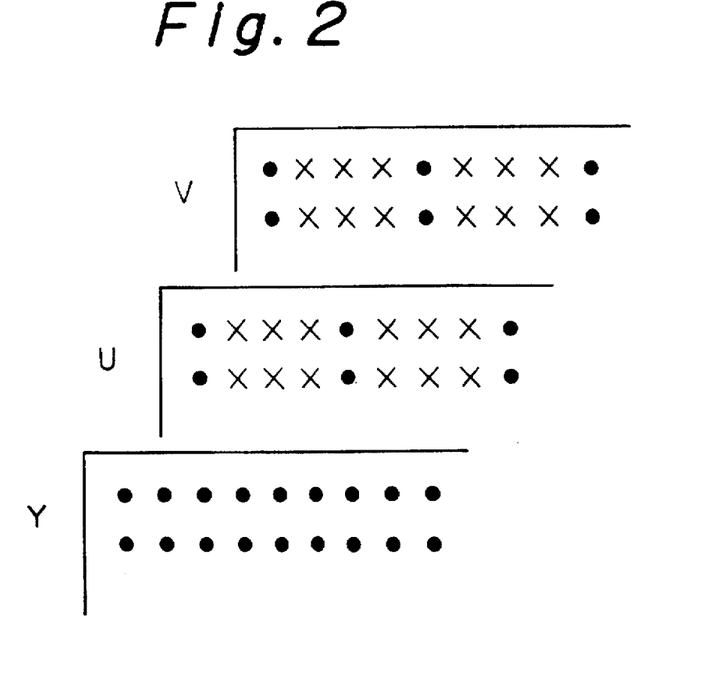
FIG. 2 is a diagram illustrating the removal of redundant components from input color difference signals as carried out by a valid information extracting circuit of the embodiment of FIG. 1.

The digital luminance signal Y and the color difference signals U and V received at the input terminals 1A–1C are supplied thereby to a valid information extracting circuit 2 which serves to remove as much redundant data within the input video signals as possible in order to supply only those portions of the input video signals which are necessary to preserve the information conveyed thereby. The amount of information contained in the color difference signals U and V is smaller than that contained in the luminance signal Y so that the amount of data within the color difference signals can be reduced further. In the embodiment of FIG. 1, the valid information extracting circuit 2 eliminates one half of the samples contained in the color difference signals U and V so that, as illustrated in FIG. 2, the number of samples included in the color difference signals U and V (wherein each remaining sample is represented by a solid dot) are only one quarter the number of samples included in the luminance signal Y.

Figure 3:
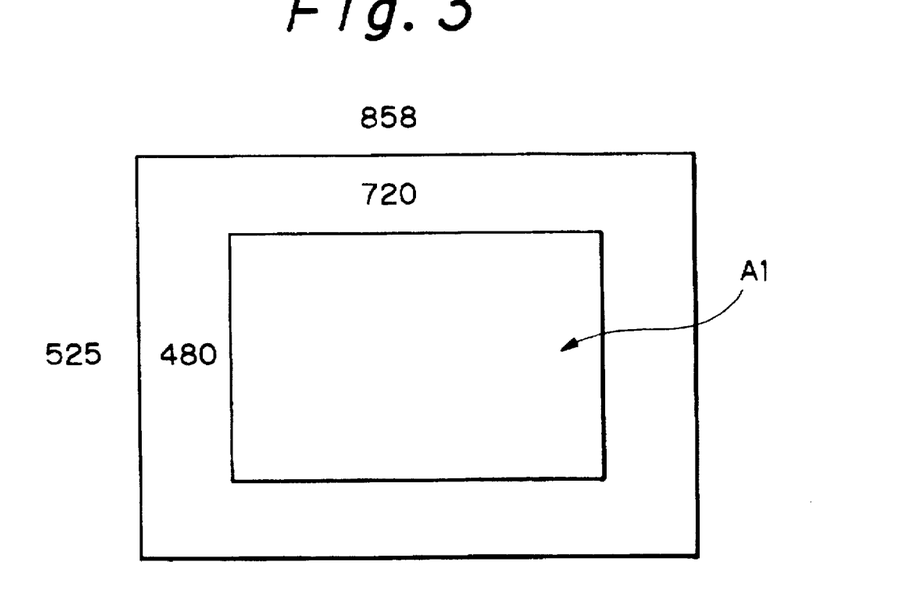
FIG. 3 illustrates the removal of both horizontal and vertical synchronizing and blanking interval signals by the valid information extracting circuit of FIG. 1 for data reduction.

A further reduction is achieved by the valid information extracting circuit 2 through the removal of the horizontal and vertical synchronizing and blanking interval signals. Consequently, the size of each frame of an NTSC video signal may be reduced from 525 lines by 858 samples to 480 lines by 720 samples, the size of an extracted valid screen A1 as illustrated in FIG. 3. It will be seen, therefore, that the valid information extracting circuit 2 serves to reduce the transmission rate of the input video signal substantially. For example, if the transmission rate of the input video signal is 216 MBPS, the circuit 2 can decrease the transmission rate to approximately 124 MBPS.

Figure 4:
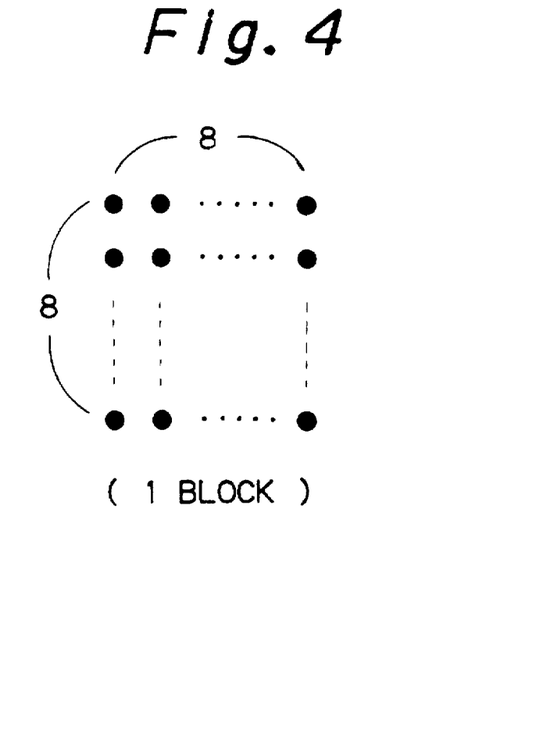
FIG. 4 illustrates an eight-by-eight block of pixels on which a discrete cosine transformation process is to be carried out by the FIG. 1 embodiment.

With reference again to FIG. 1, the luminance signal Y and color difference signals U and V output by the valid information extracting circuit 2 are supplied to block segmentation circuits 3A, 3B and 3C, respectively. The block segmentation circuits 3A, 3B and 3C form their respective signals Y, U and V into DCT blocks so that each may subsequently be transformed into frequency domain information by a discrete cosine transformation process, described in greater detail hereinbelow. Each DCT block thus formed includes (8×8) pixels, as illustrated in FIG. 4. As noted hereinabove, each pixel includes 8 bits.

The block segmentation circuits 3A–3C provide their respective outputs to a macro-block composing circuit 4. The circuit 4 arranges the luminance signal Y and the color difference signals U and V in block format into respective macro blocks each including signals representing a corresponding area of a given video frame. The macro-block format facilitates shuffling by the recording system and interpolation of the signals upon reproduction, both as described in greater detail hereinbelow.

Figure 5:
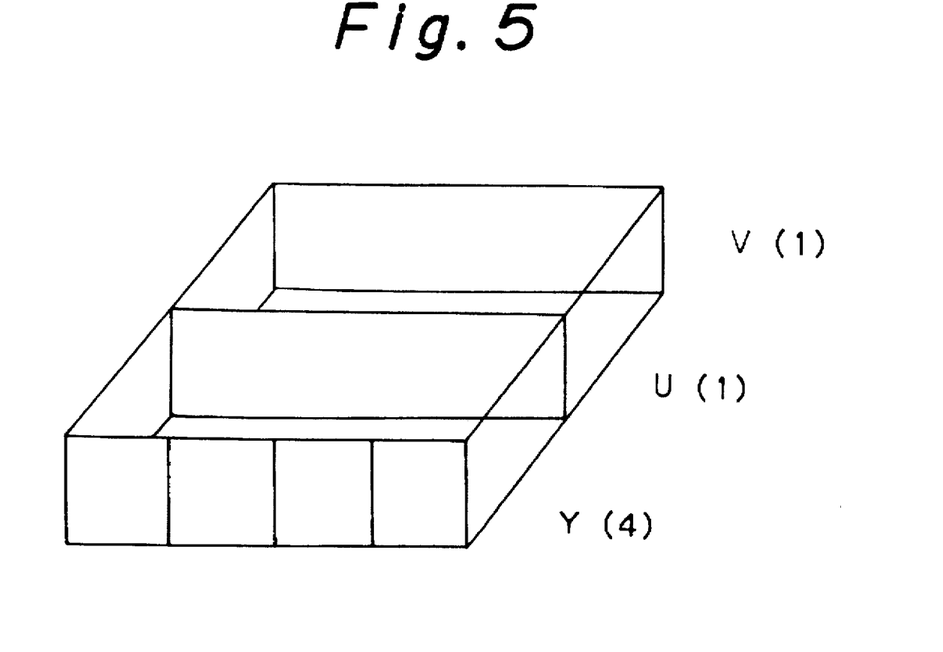
FIG. 5 illustrates the composition of a macro-block including both luminance and color difference signals formed by a macro-block composing circuit of FIG. 1.

Since the digital luminance signal Y and the color difference signals U and V are supplied to the recording system in a (4:2:2) format at the inputs 1A–1C and the circuit 2 reduces the number of samples of the color difference signals by half, as supplied to the macro-block composing circuit 4, there are four times as many luminance pixels as color difference pixels U or V for a given area of the video frame. The macro-block composing circuit 4, therefore, includes four blocks of pixel data for the luminance signal and one block each of the pixel data for the color difference signals U and V in each macro block representing a corresponding area of the video frame as illustrated in FIG. 5.

Referring again to FIG. 1, the macro-block composing circuit 4 supplies the luminance and color difference data in macro-block format to a shuffling circuit 5. As noted above, each of the macro blocks represents luminance and color difference signals of a predetermined area in a given video frame. The shuffling circuit 5 assembles the received macro blocks into groups each including three adjacent macro blocks and referred to herein as super macro blocks.

Figure 6:
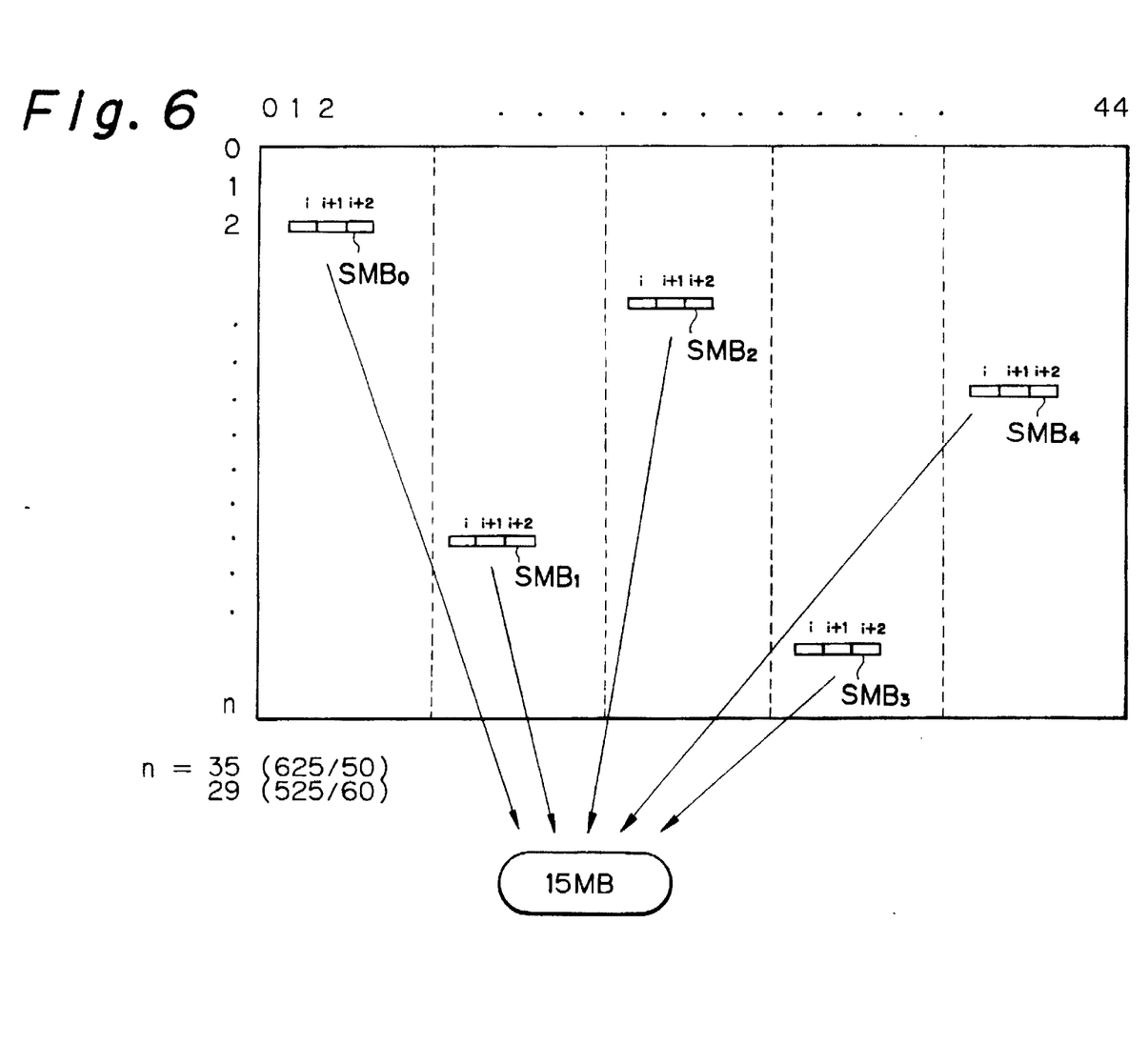
FIG. 6 illustrates a macro block shuffling process carried out by a shuffling circuit of the FIG. 1 embodiment.

Referring also to FIG. 6, the shuffling circuit 5 shuffles the super macro blocks by collecting them in groups of five super macro blocks wherein each of the five super macro blocks within each group is selected from a respectively different area of the video screen. FIG. 6 illustrates the shuffling process carried out for one field of video data, the field being arranged as 45 macro blocks in the horizontal direction thereof by (n+1) macro blocks in the vertical direction thereof. In this embodiment, n=29 for an NTSC signal having 525 lines per frame and n=35 for a PAL signal having 625 lines per frame. As illustrated in FIG. 6, the shuffling process is carried out by selecting one super macro block $SMB_0$, $SMB_1$ . . . , $SMB_4$ from each of five corresponding, horizontally separated areas of the video field to assemble each group thereof. The selection of the super macro blocks in this fashion is carried out so that the their horizontal positions do not match. As thus collected in accordance with the shuffling process, groups of fifteen macro blocks are output by the shuffling circuit 5 to a discrete cosine transformation (DCT) circuit 6 of FIG. 1.

Figure 7:
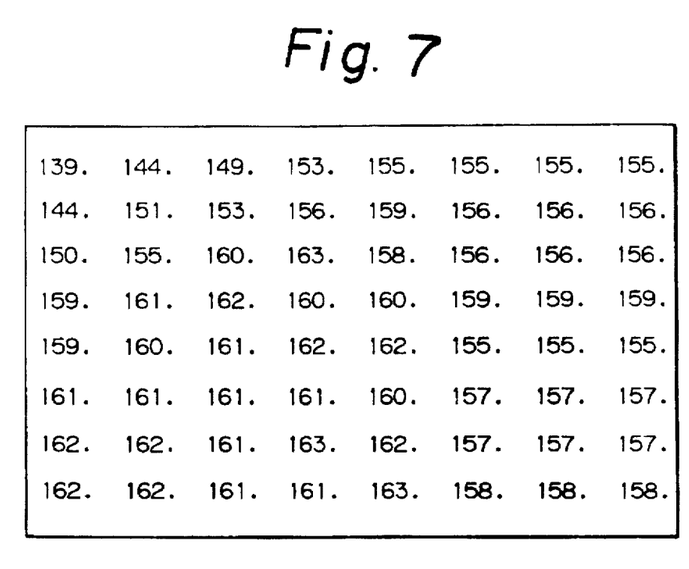
FIG. 7 illustrates an eight-by-eight block of video data in the time domain to be processed in accordance with discrete cosine transformation.
Figure 8:
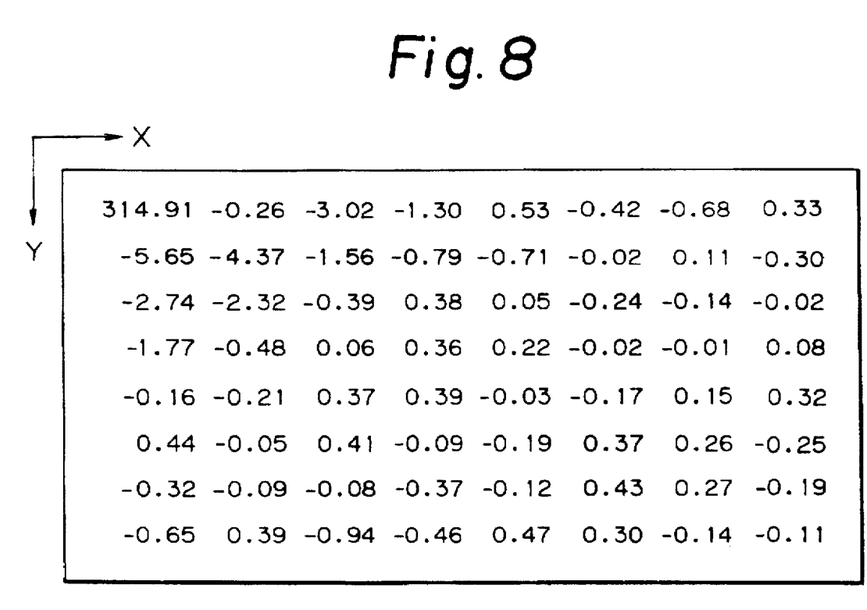
FIG. 8 illustrates frequency components resulting from the discrete cosine transformation of the eight-by-eight block of time domain data of FIG. 7.

The DCT circuit 6 serves to carry out a discrete cosine transformation of each of the DCT blocks included in each group of fifteen macro blocks received from the shuffling circuit 5. An exemplary discrete cosine transformation of an eight-by-eight DCT block will now be illustrated with reference to FIGS. 7 and 8. FIG. 7 illustrates an exemplary eight-by-eight pixel DCT block prior to transformation thereof by the circuit 6. In accordance with the discrete cosine transformation process carried out by the circuit 6, an orthogonal transformation of the time domain data in the DCT block is carried out to yield a corresponding block of data in the frequency domain. FIG. 8 illustrates DCT frequency components produced through the discrete cosine transformation of the values in the DCT block of FIG. 7. In FIG. 8, frequency components of the DCT block along the horizontal direction of the transformed data are arranged along the X axis such that the frequency thereof increases with increasing values of the X-coordinate. In like manner, the Y axis in FIG. 8 represents frequency components in the vertical direction of the eight-by-eight DCT block of FIG. 7. In the case of the Y axis, the Y-coordinate values are negative so that decreasing Y-coordinate values indicate increasing frequency of the corresponding components of the transformed block.

Since video frames exhibit correlation, upon the discrete cosine transformation of video signals the resulting DC component of a given transformed block is typically very large as compared with the AC components thereof. Accordingly, in the example of FIG. 8, the DC component located at the upper left hand corner of the transformed block as illustrated has a value of 314.91 which is approximately two orders of magnitude larger than the largest AC component thereof. In addition, lower frequency components of a given transformed block in general possess larger values than higher frequency components thereof. Generally speaking, the levels of the high frequency components become very small relative to the DC and lower frequency components. It will be appreciated that variable-length encoding of the AC component values by assigning appropriate numbers of bits thereto in accordance with their visual properties, results in a substantial decrease in the amount of data required to convey a corresponding amount of information. As an example, it was noted above that, by removing redundant portions of the data from the input video signal by means of the valid information extracting circuit 2, the transmission rate of the input video signal may be decreased from 216 MBPS to approximately 124 MBPS. Further, by virtue of the highly efficient coding process described above, the amount of data can be further decreased by a factor of approximately five. Consequently, the input transmission rate of 216 MBPS can be reduced to approximately 25 MBPS in this example.

As seen above, the DC component of each transformed video signal block typically possesses a very large value relative to the AC components thereof. The DC components are, therefore, the most important of the transformed data. Accordingly, unlike the AC components, the DC components are transferred directly without modification for reducing the amount of data therein. The AC components, however, are subjected to quantization and variable length encoding for recording as described in greater detail hereinbelow.

In general, the AC components of fifteen grouped macro blocks (that is, the five super macro blocks grouped together by the macro-block composing circuit 4) as output by the DCT circuit 6 are stored temporarily in a buffer memory 7. Thereafter they are output to a quantizer 8 for quantization and subsequently are variable length encoded by a variable length encoder 9 which serves to compress the amount of data therein. The quantizer 8 employs a selected set of quantization intervals to maintain the amount of data representing each frame substantially equal to a predetermined amount. Data indicating the selected set of quantization intervals is transmitted together with the DC components and the variable length encoded AC components, along with further information as described below.

In greater detail, the DC components supplied by the DCT circuit 6 are represented by a fixed length code and are provided directly to a frame segmentation and error correcting circuit 15 to be assembled with the remaining data for transmission and recording. At the same time that the AC components for a given fifteen macro-block group are stored in the buffer memory 7, the AC components are likewise supplied to a quantizer 10 which serves to quantize the components by weighting each thereof in accordance with its visual properties. That is, since higher frequency components do not possess high visibility, they are divided by a relatively large quantization interval in the quantization process. Due to the relatively greater visibility of the lower frequency components, however, they are divided by a relatively small quantization interval in this process.

Figure 9:
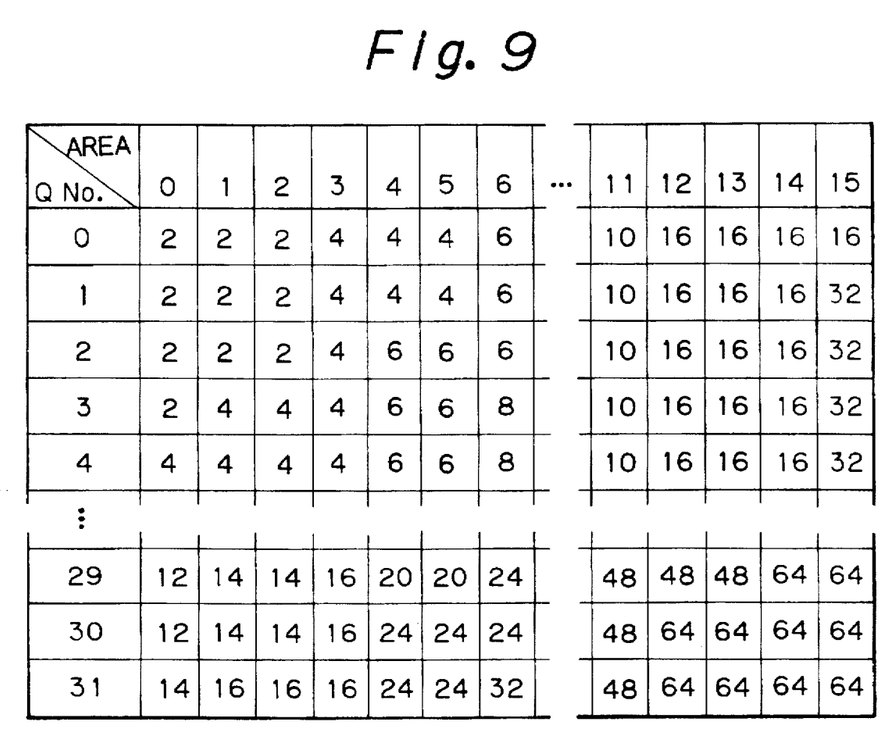
FIG. 9 is a table illustrating plural sets of quantization intervals to be used selectively by a quantizer of the FIG. 1 embodiment.
Figure 10:
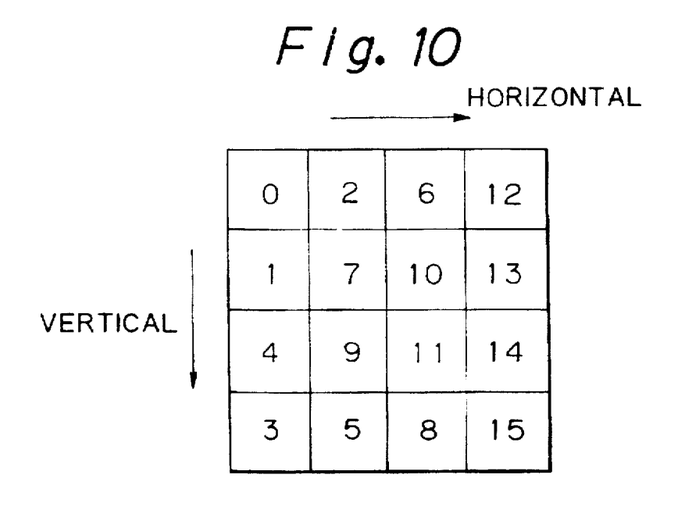
FIG. 10 illustrates a manner in which a set of quantization intervals, selected from the table of FIG. 9, is employed by the quantizer of FIG. 1 for quantizing a discrete cosine transformed data block.

With reference also to FIG. 9, in the disclosed embodiment, thirty-two predetermined sets of quantization intervals identified by quantization (Q) numbers 0 through 31 are provided to be used selectively by the quantizer 10. FIG. 10 schematically illustrates the arrangement of an eight-by-eight DCT block wherein groups of four adjacent pixels are designated as respective numbered areas 0–15. The horizontal axis of the table provided by FIG. 9 is arranged according to the numbered areas as illustrated in FIG. 10. It will be seen that each such area is assigned a corresponding quantization interval in accordance with the table of FIG. 9 when the Q number of a respective set of quantization intervals is specified. The relative sizes of the quantization intervals increase with increasing area number as well as with increasing Q numbers. Once the AC component values have been thus divided, they are rounded to nearest respective integer values in a manner determined according to their corresponding area numbers assigned as shown in FIG. 10. That is, divided component values with decimal remainders are rounded up if they fall within any of areas 0, 1, 2, 4, 6, 7, 9, 10, and 11, but are rounded down if they fall within any of areas 3, 5, 8, 12, 13, 14 and 15.

Figure 11:
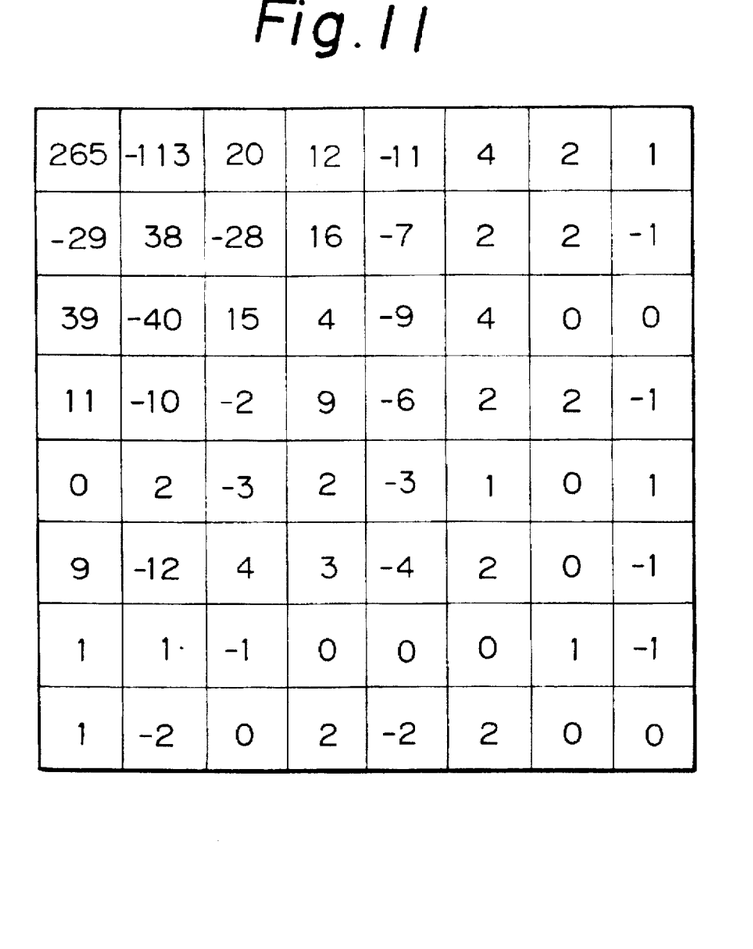
FIG. 11 illustrates a block of discrete cosine transformed data to be quantized by the quantizer of FIG. 1.
Figure 12:
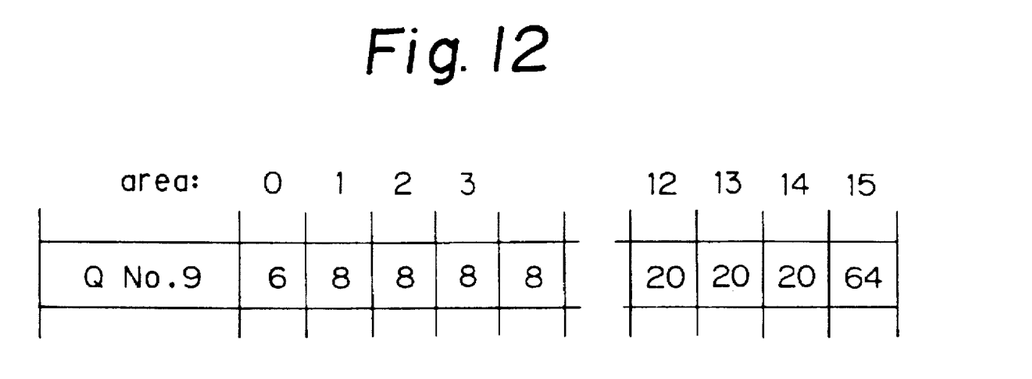
FIG. 12 illustrates a selected set of quantization intervals for use in quantizing the block of FIG. 11.
Figure 13:
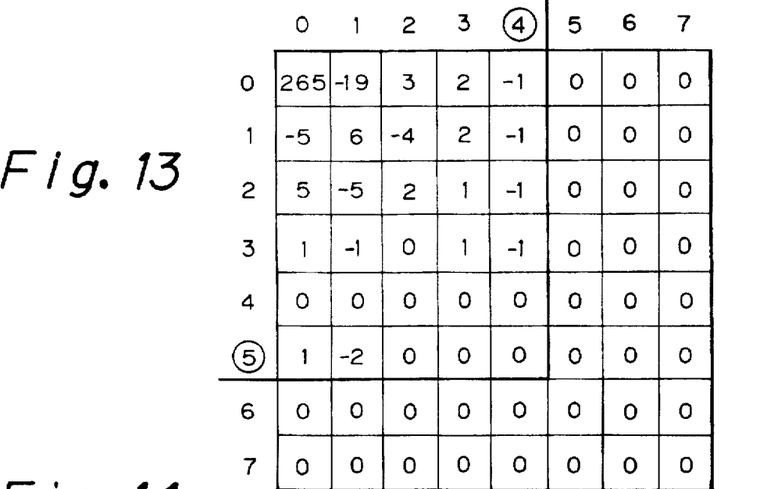
FIG. 13 illustrates a block of data resulting from the quantization of the discrete cosine transformed data of FIG. 11 with the use of the set of quantization intervals illustrated in FIG. 12.

As an example, it is assumed that DCT transformed values as illustrated in FIG. 11 are produced by the DCT circuit 6 for a given DCT block. These values are supplied to the quantizer 10 which proceeds to divide all of the AC components (that is, all of the components included in FIG. 11 with the exception of the DC component value at the upper left hand corner thereof) with the use of a selected set of quantization intervals from the table of FIG. 9. If it is assumed that the set of quantization intervals designated by the Q number 9 is selected for use by the quantizer 10 (as described in greater detail hereinbelow) then the quantization intervals as illustrated in FIG. 12 are employed for dividing the AC component values from the respective areas 0–15 of FIG. 11 as defined in the manner illustrated in FIG. 10. Since, as described hereinabove, the resulting values having decimal remainders are rounded to one of the two nearest integer values, the quantized data as illustrated in FIG. 13 is provided by the quantizer 10 in this example.

The quantized data produced by the quantizer 10 is supplied to a transfer area determination circuit 11 which serves to determine the horizontal and vertical boundaries within each quantized data block beyond which the quantized data are uniformly equal to zero. In the example of the FIG. 13, these boundaries are X=4 and Y=5. Such horizontal and vertical boundaries define a transfer area (H, V), or (4, 5) in the example of FIG. 13, which is output by the transfer area determination circuit 11 as six bits of data, (100101) in the example of FIG. 13. The transfer area determination circuit 11 supplies the transfer area data to the frame segmentation and error correction coding circuit 15 described in greater detail hereinbelow.

Figure 14:
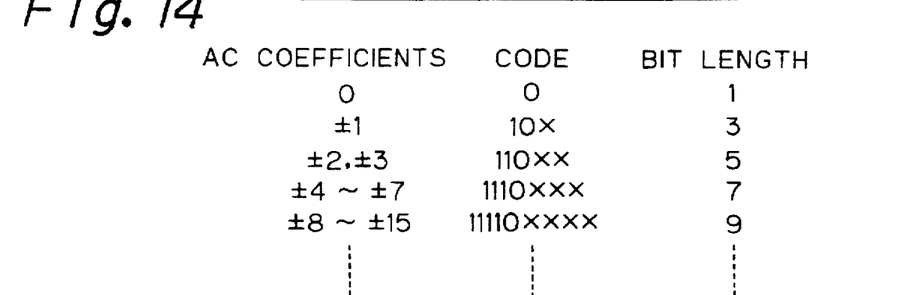
FIG. 14 is an exemplary Huffman table used in estimating an amount of data resulting from variable length encoding for determining whether a predetermined data transfer rate of the digital VTR of FIG. 1 will be exceeded.
Figure 15:
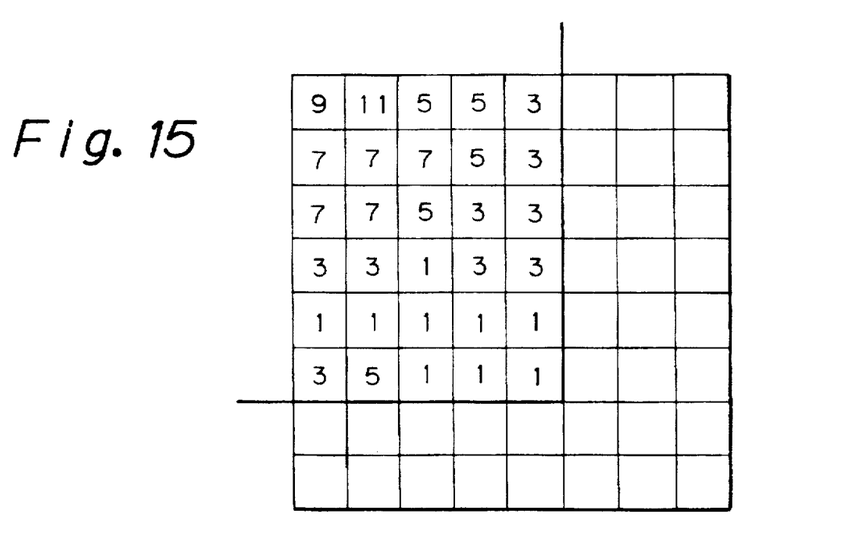
FIG. 15 illustrates numbers of bits assigned to corresponding ones of the quantized data of FIG. 13 as a result of variable-length encoding with the use of the Huffman codes of FIG. 14.

The transfer area determination circuit 11 also supplies the quantized data received from the quantizer 10 to a code amount determination circuit 12. The circuit 12, by referencing a Huffman table 13, produces an estimate of the amount of variable length encoded data that would be produced by the quantizer 8 with the use of the selected set of quantization intervals employed by the quantizer 10. An exemplary Huffman table is set forth in FIG. 14 which illustrates the length of the code assigned to various values of quantized AC components or coefficients when they are encoded in the form of variable-length Huffman codes. In the example of the quantized AC components as illustrated in FIG. 13, each of the components within the transfer area is assigned a Huffman code having the number of bits in each case as illustrated in FIG. 15.

The code amount as determined by the circuit 12 is supplied to a quantizer selecting circuit 14 which serves to determine whether or not the amount of the quantized and variable length encoded data within the 15 macro blocks stored in the buffer memory 7 is less than a predetermined amount corresponding with a transfer rate of the digital VTR of the disclosed embodiment. When the amount of data is found to be not less than the predetermined amount, a new set of quantization intervals for use by the quantizer 10 is selected and then the amount of the variable length encoded data is once again determined by the circuit 14. It will be appreciated that through the appropriate selection of the set of quantization intervals for use by the quantizer 10, the amount of the encoded data can be made less than the predetermined amount.

Once the selection of the set of quantization intervals yields an amount of encoded data which is less than such predetermined amount, the data for the fifteen macro blocks stored in the buffer memory 7 are output to the quantizer 8 which employs the then selected set of quantization intervals for quantizing the received data. The quantized data is, in turn, supplied by the quantizer 8 to a variable length encoder 9 which serves to encode the received data into variable length data, for example, Huffman codes. The variable length encoded data is thereupon supplied by the encoder 9 to the frame segmentation and error correction coding circuit 15.

As noted above, the frame segmentation and error correction coding circuit 15 also receives the DC coefficient data for the fifteen macro blocks from the DCT circuit 6 as well as the transfer area data (H, V) from the transfer area determining circuit 11. The circuit 15 also receives data indicating the selected set of quantization intervals from the quantizer selecting circuit 14. The received data is then transformed by the frame segmentation and error correction coding circuit 15 into data frames, as described in greater detail hereinbelow, and the circuit 15 then adds an error correction code to the resultant data.

Figure 16:
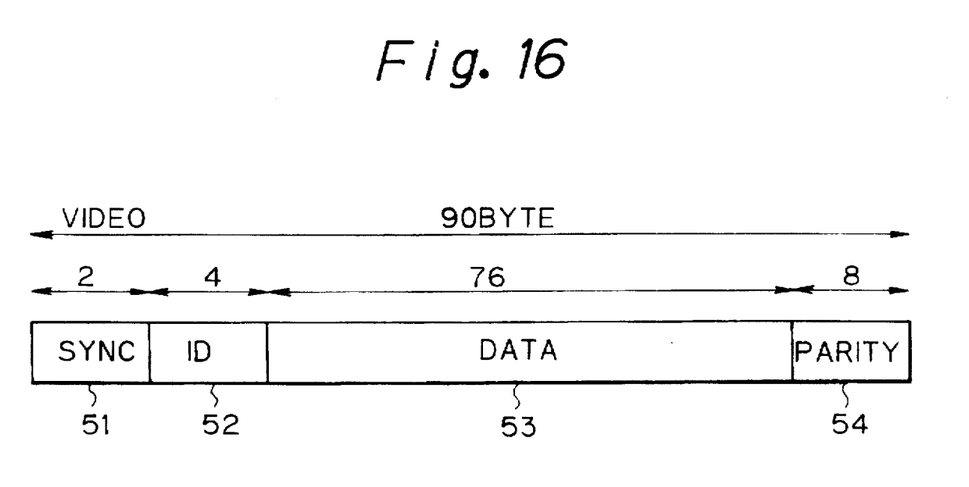
FIG. 16 illustrates the frame construction of a sync block including encoded video data and produced by a frame segmentation and error correction coding circuit of FIG. 1.

As illustrated schematically in FIG. 16, each data frame is arranged in a sync block format including ninety bytes. Two sync bytes 51 are arranged at the beginning of the sync block followed an ID 52 including four bytes of data. Following the ID 52 indicated as the data 53 are 76 bytes including DC component data and various variable-length encoded AC component data. Following the data 53 are eight bytes of parity data 54.

Figure 17:
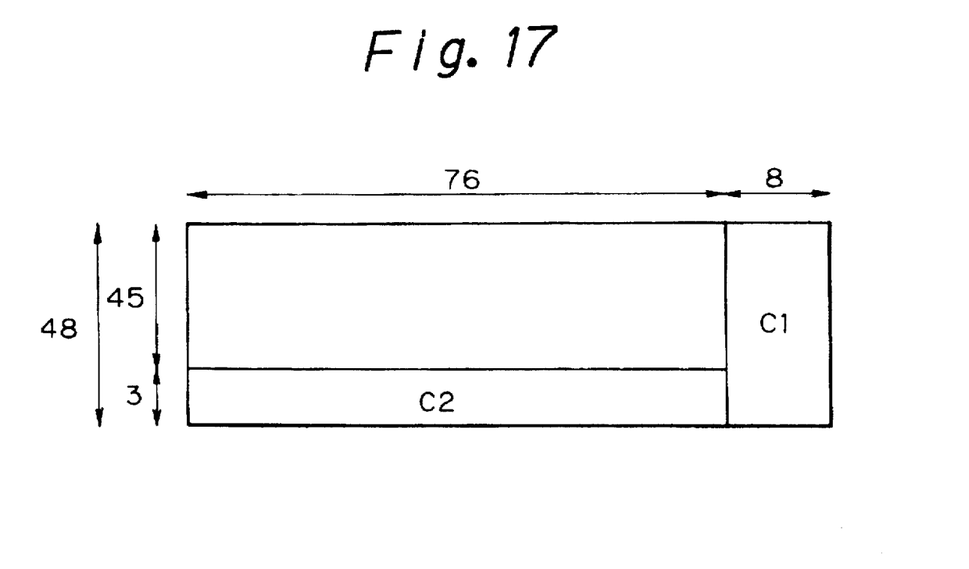
FIG. 17 illustrates an error correction coding process carried out by the frame segmentation and error correction coding circuit of FIG. 1.

FIG. 17 illustrates the error correction coding process carried out by the frame segmentation and error correction coding circuit 15. As illustrated in FIG. 17, the data is allocated in a 2-dimensional array of 76 bytes by 45 bytes and product codes are generated to form 8 bytes of a Reed-Solomon code in the horizontal direction indicated as the parity C1, while a 3 byte Reed-Solomon code is added in the vertical direction indicated as the parity C2 in FIG. 17.

Since as shown in FIG. 16 each data frame is arranged as a sequence of bytes, that is, as a sequence of fixed length data, the variable length encoded data will in some instances fall within more than one byte and in others will be represented by less than a byte of data. Accordingly, the boundaries of the variable length encoded data often will not correspond with the beginning of a given byte of data within the data frame and, should an uncorrectable error take place in any one byte, the boundaries of the variable length data following the uncorrectable byte will not be identifiable. Consequently, even if no error occurs in the remaining data, the inability to distinguish the following variable-length data one from the next will render all unusable and a propagation error will result.

Figure 18:
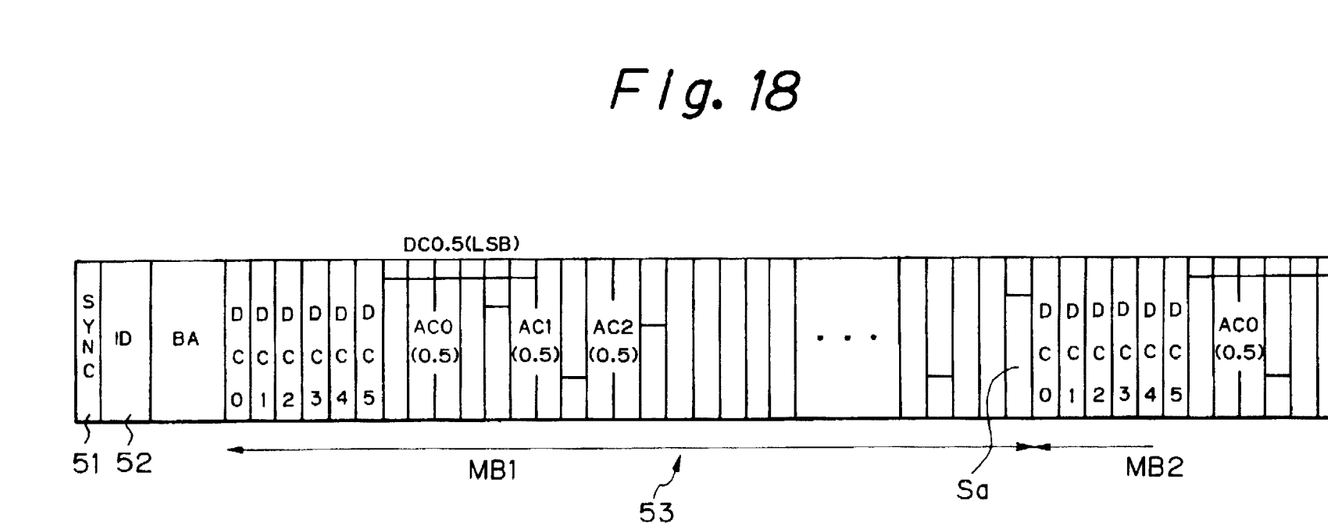
FIG. 18 illustrates the allocation of various types of data within a sync block produced by the frame segmentation and error correction coding circuit of FIG. 1.

The present invention in certain aspects substantially alleviates this problem by advantageously allocating the data within a predetermined data sequence. An example of such an allocation arranges data within a data frame in the manner illustrated in FIG. 18. As illustrated in FIG. 18, following the ID 52, a block address BA is inserted. Following the block address BA the fixed length DC components and variable length encoded AC components of a first macro block MB1 (including four luminance signal blocks and two respectively different color difference signal blocks, as described hereinabove) are inserted. Included within the first macro block are the fixed length encoded DC component data of the six blocks thereof indicated as DC0 through DC5 in a group of six sequential bytes. Following the DC component data are the variable length encoded AC components of the six blocks arranged in groups of AC components representing corresponding frequency ranges for each of the six blocks. The groups of AC components are indicated as ACn, n=0, 1, 2 . . . , wherein n represents a corresponding frequency range of the AC components arranged to begin with the lowest frequency range (n=0) and followed by successively higher frequency ranges n=1, 2, . . . . Accordingly, the AC components are arranged in the order of ascending frequency range within the macro block MB1.

A second macro block MB2 having the same format as the macro block MB1 is arranged to follow the macro block MB1. However, the beginning of the macro block MB2 and each succeeding macro block corresponds with the beginning of a symbol or byte within the data sequence. Accordingly, if the data of the macro block MB1 (or any succeeding macro block) ends in a position other than the end of a symbol or byte, a space is created between the macro blocks. In that event dummy data is placed in the space. A space between the macro blocks MB1 and MB2 is represented in FIG. 18 by the area Sa. The block address BA preceding the macro block MB1, as described hereinabove, indicates the location of the beginning of the following macro block MB2 in the data sequence.

As noted hereinabove, in the case of DCT transformed data, the DC components and lower frequency components are most important in terms of information content, while higher frequency components are relatively much less important. When an error correction process is performed for variable length encoded data with the use of Reed-Solomon codes, the presence of an uncorrectable error in a single byte of data results in the inability to reproduce the following data. By arranging the DC components and lower frequency components such that they precede the higher frequency components in the data sequence, the probability that a serious problem will occur due to an uncorrectable error in a randomly occurring byte is made relatively low.

Moreover, since the beginning of the next macro block corresponds with the beginning of a symbol within the data sequence, the occurrence of an error in a symbol or byte of a preceding macro block will not affect the reproduceability of the following macro block. Accordingly, the data within the following macro block can be reliably reproduced despite such an error.

With reference again to FIG. 1, the data sequence thus produced by the frame segmentation and error correction coding circuit 15 is supplied thereby to a channel encoder 16 which modulates the data stream for recording on magnetic tape in accordance with a predetermined modulation technique. The thus-modulated data is output by the channel encoder 16 to recording heads 18A and 18B through recording amplifiers 17A and 17B, respectively, to be transmitted thereby for recording on magnetic tape.

Figure 19:
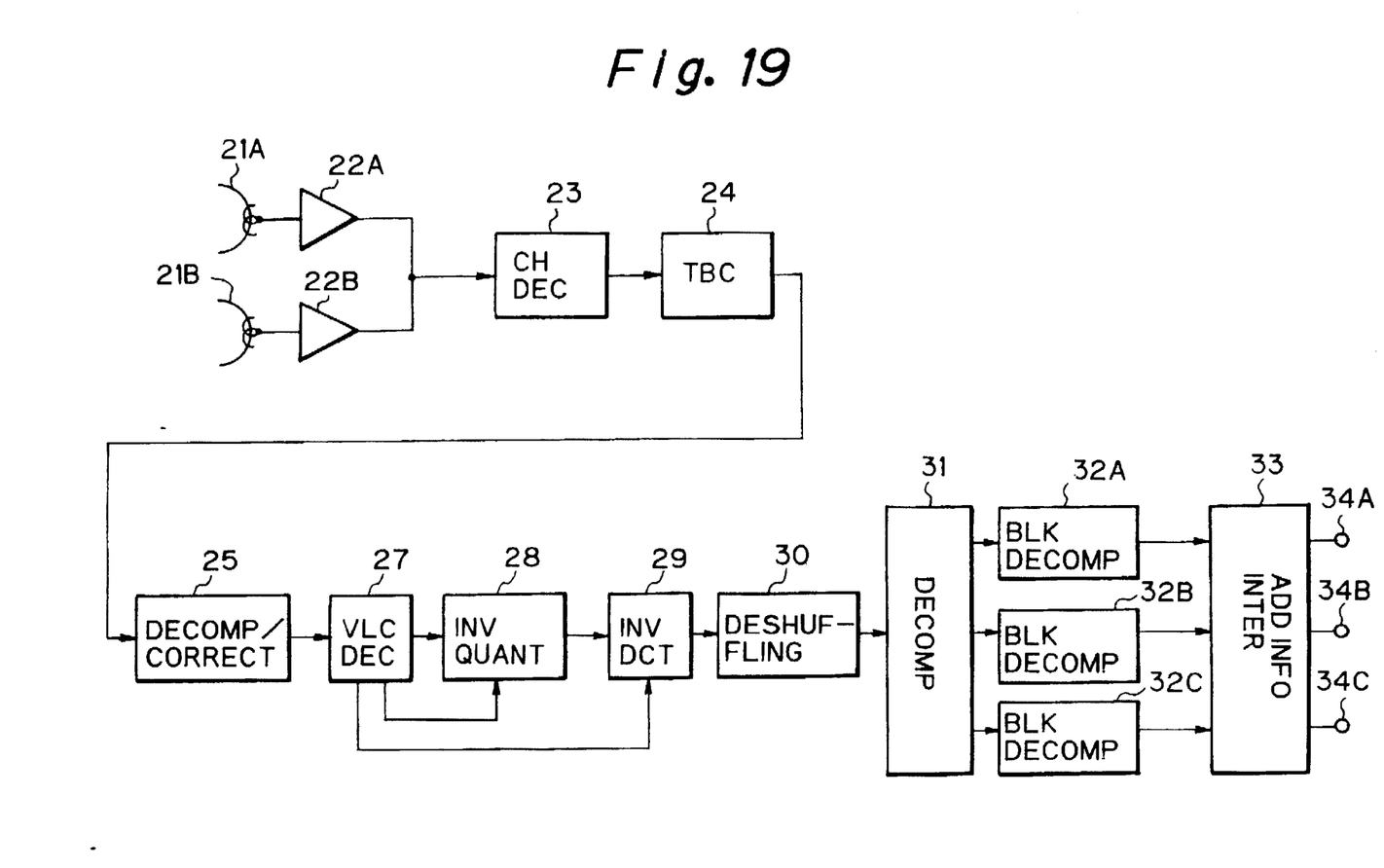
FIG. 19 is a block diagram of a reproducing system of the digital VTR of FIG. 1.

Referring now to FIG. 19, a reproducing system of the digital VTR of the disclosed embodiment is illustrated in block format therein. The reproducing system includes reproducing heads 21A and 21B which supply signals reproduced from a magnetic tape to a channel decoder 23 through respective reproducing amplifiers 22A and 22B. The channel decoder 23 serves to demodulate the reproduced data in accordance with a process complementary to that of the modulation process carried out by the channel encoder 16 of the recording system. The demodulated reproduction signals are supplied by the channel decoder 23 to a time base compensation (TBC) circuit 24 which serves to remove time-base fluctuation within the reproduced signals.

The time-base compensated reproduced signals are output by the TBC circuit 24 to a frame decomposition and error correction processing circuit 25 which is operative to correct errors in the reproduced data. The circuit 25 also serves to separate the variable-length encoded AC component data, the DC component data and the additional information including the transfer area information (H, V) and the data indicating the selected set of quantization intervals for the reproduced data. The variable-length encoded AC component data are supplied to a variable length decoder 27 which is operative to decode the Huffman-encoded AC component data. The decoded AC component data is supplied by the decoder 27 to an inverse quantizing circuit 28 whose operational characteristics are determined in accordance with the data included in the reproduced signal indicating the set of quantization intervals employed for quantizing the corresponding data. The data thus subjected to inverse quantization by the circuit 28 is, in turn, supplied to an inverse DCT circuit 29 which transforms the frequency domain data back into time domain data and supplies the thus-transformed data to a deshuffling circuit 30. The deshuffling circuit 30, in turn, carries out a deshuffling process which is the inverse of the shuffling process carried out by the circuit 5 of the recording system illustrated in FIG. 1.

Once the data has been deshuffled by the circuit 30, it is then supplied to a macro-block decomposition circuit 31 which serves to separate the macro-block data into DCT blocks including the component signals Y, U and V. The macro-block decomposition circuit 31 then supplies the separated macro-block data to block decomposition circuits 32A, 32B and 32C which serve, respectively, to separate the Y, U and V components of the received DCT blocks into data corresponding with a valid screen.

The component signals Y, U and V are then supplied by the circuits 32A–32C to an additional information interpolation circuit 33 which serves to interpolate the components U and V in order to reconstruct the color difference signals U and V. The circuit 33 also adds horizontal and vertical blanking interval signals to the component signal Y, U and V which it then supplies at output terminals 34A, 34B and 34C, respectively, of the reproducing system of FIG. 19.

It will be seen, therefore, that the present invention in certain advantageous embodiments arranges DC component data so that it precedes variable length encoded AC component data arranged sequentially from lower frequencies to higher frequencies. In such embodiments, the data are arranged in a macro-block format so that the macro blocks are arranged sequentially in a data sequence so that the beginning of each macro block corresponds with the beginning of a symbol within the data sequence. In addition, a block address is provided in association with a preceding macro block for indicating the position of a subsequently arranged macro block.

Accordingly, when discrete cosine transformation is employed in order to compress video data, so that the video data is transformed into frequency domain data including DC components and AC components, by arranging the resulting frequency domain data so that DC components precede AC components which in turn are arranged so that lower frequencies precede higher frequencies, the occurrence of an error in one byte resulting in an inability to reproduce subsequently received data is not likely to cause a serious problem. Moreover, by arranging the beginning of each macro block within the data sequence to correspond with the beginning of a symbol, the occurrence of an error in a preceding macro block will not affect the reproduceability of a subsequently received macro block.

It will be appreciated that methods and apparatus in accordance with the present invention may, for example, be implemented in whole or in part with the use of hardwired circuits or with the use of a microprocessor, microcomputer, or the like.

Although a specific embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A method of encoding a digital video signal provided as a plurality of blocks of video data, comprising the steps of:

performing a discrete cosine transformation of each of said blocks of video data to provide corresponding blocks of transformed video data, each of said corresponding blocks of transformed video data including a respective DC component and a respective plurality of AC components having respective different frequencies;

quantizing relatively lower frequency ones of the respective AC components in a block with the use of first quantization intervals and quantizing relatively higher frequency ones of the respective AC components in the same block with the use of second quantization intervals relatively larger than said first quantization intervals;

variable-length encoding said respective plurality of AC components of each of said corresponding blocks of transformed video data;

arranging the respective DC component and the respective variable-length encoded AC components of each of said corresponding blocks of transformed video data in an order such that said respective DC component precedes said respective variable-length encoded AC components and said relatively lower frequency ones of said respective variable-length encoded AC components precede said relatively higher frequency ones of said respective variable-length encoded AC components; and providing error correction codes for said corresponding blocks of transformed video data.

2. The method of claim 1, further comprising the step of forming a transmission signal by combining the arranged respective DC component and respective variable-length encoded AC components of each of said plurality of corresponding blocks of transformed video data with said error correction codes.

3. The method of claim 2, in combination with the step of recording said transmission signal on a record medium.

4. The method of claim 3, wherein the step of recording said transmission signal comprises recording said transmission signal on a magnetic tape.

5. The method of claim 1, further comprising the step of evaluating an amount of data resulting from the quantization of said respective plurality of AC components, and, if said amount of data exceeds a predetermined amount based on a transmission capacity for the encoded video signal, requantizing said respective plurality of AC components with the use of a plurality of respective quantization intervals relatively larger than corresponding ones of the first and second quantization intervals.

6. An apparatus for encoding a digital video signal provided as a plurality of blocks of video data, comprising:

discrete cosine transformation means for performing a discrete cosine transformation of each of said blocks of video data to provide corresponding blocks of transformed video data, each of said corresponding blocks of transformed video data including a respective DC component and a respective plurality of AC components having respective different frequencies;

means for quantizing relatively lower frequency ones of the respective AC components in a block with the use of first quantization intervals and quantizing relatively higher frequency ones of the respective AC components in the same block with the use of second quantization intervals relatively larger than said first quantization intervals;

variable-length encoding means for variable-length encoding said respective plurality of AC components of each of said corresponding blocks of transformed video data;

arranging means for arranging the respective DC component and the respective variable-length encoded AC components of each of said corresponding blocks of transformed video data in an order such that said respective DC component precedes said respective variable-length encoded AC components and said relatively lower frequency ones of said respective variable-length encoded AC components precede said relatively higher frequency ones of said respective variable-length encoded AC components; and error correction coding means for providing error correction codes for said corresponding blocks of transformed video data.

7. The apparatus of claim 6, further comprising means for forming a transmission signal by combining the arranged respective DC component and respective variable-length encoded AC components of each of said plurality of corresponding blocks of transformed video data with said error correction codes.

8. The apparatus of claim 7, further comprising means for recording said transmission signal on a record medium.

9. The apparatus of claim 8, wherein the recording means is operative to record said transmission signal on a magnetic tape.

10. The apparatus of claim 6, further comprising means for evaluating an amount of data resulting from the quantization of said respective plurality of AC components and determining whether said amount of data exceeds a predetermined amount based on a transmission capacity for the encoded video signal, and wherein the quantizing means is operative to requantize said respective plurality of AC components with the use of a plurality of respective quantization intervals relatively larger than corresponding ones of the first and second quantization intervals when said amount of data exceeds said predetermined amount.

11. A method of encoding a digital video signal provided as a plurality of blocks of video data, comprising the steps of:
  performing a discrete cosine transformation of each of said plurality of blocks of video data to provide a plurality of corresponding blocks of transformed video data each including a plurality of frequency domain components;
  variable-length encoding at least some of said plurality of frequency domain components of each of said plurality of corresponding blocks of transformed video data to form a plurality of corresponding variable-length encoded frequency domain components;
  arranging said plurality of corresponding blocks of transformed video data as a sequence of fixed length symbols such that respective beginnings of at least some of said plurality of corresponding blocks of transformed video data correspond with the beginnings of respective symbols within said sequence of fixed length symbols;
  including an address within said sequence of fixed length symbols at a position in association with one of said plurality of corresponding blocks of transformed video data, said address indicating a position of one of said at least some of said plurality of corresponding blocks of transformed video data within the next of said fixed length symbols in said sequence following said one of the plurality of corresponding blocks of transformed video data with which said position of the address is associated; and
  providing error correction codes within said sequence of fixed length symbols for said plurality of corresponding blocks of transformed video data.

12. The method of claim 11, wherein the step of arranging said plurality of corresponding blocks of transformed video data comprises arranging a first macro block comprising at least two of said plurality of corresponding blocks of transformed video data as a first group of said sequence of fixed length symbols such that the beginning of a first one of said at least two of said plurality of corresponding blocks of transformed video data corresponds with the beginning of a respective first symbol within said sequence of fixed length symbols, and arranging a second macro block comprising at least two of said plurality of corresponding blocks of transformed video data as a second group of said sequence of fixed length symbols following said first group of said sequence of fixed length symbols such that the beginning of a first one of said at least two of said plurality of corresponding blocks of transformed video data of said second macro block corresponds with the beginning of a respective second symbol within said sequence of fixed length symbols.

13. The method of claim 12, wherein the step of including an address within said sequence of fixed length symbols comprises including said address within said first group of said sequence of fixed length symbols, said address indicating a location of the beginning of the first one of the at least two blocks of said second macro block.

14. The method of claim 12, wherein the step of performing a discrete cosine transformation comprises providing a respective DC component and a respective plurality of AC components of each of said plurality of corresponding blocks of transformed video data, and wherein the step of arranging the first and second macro blocks comprises grouping the respective DC components and respective AC components of the plurality of corresponding blocks of transformed video data having corresponding frequencies together within each of the first and second macro blocks.

15. The method of claim 14, wherein the step of arranging the first and second macro blocks comprises arranging the grouped respective DC components of each of the macro blocks to precede the grouped respective AC components thereof and arranging relatively lower frequency ones of the grouped respective AC components thereof within each macro block to precede relatively higher frequency ones thereof.

16. The method of claim 15, wherein the step of arranging the respective AC components within each macro block comprises arranging the respective AC components thereof in order of ascending frequency.

17. The method of claim 11, in combination with the step of recording said sequence of fixed length symbols on a record medium.

18. The method of claim 17, wherein the step of recording said sequence of fixed length symbols comprises recording said sequence of fixed length symbols on a magnetic tape.

19. The method of claim 11, in combination with the step of transmitting said sequence of fixed length symbols.

20. The method of claim 12, wherein the first and second macro blocks each includes luminance and color difference data for respective areas of a corresponding video screen.

21. An apparatus for encoding a digital video signal provided as a plurality of blocks of video data, comprising:
  transform means for performing a discrete cosine transformation of each of said plurality of blocks of video data to provide a plurality of corresponding blocks of transformed video data each including a plurality of frequency domain components;
  variable-length encoding means for variable-length encoding at least some of said plurality of frequency domain components of each of said plurality of corresponding blocks of transformed video data to form a plurality of corresponding variable-length encoded frequency domain components;
  sequencing means for arranging said plurality of corresponding blocks of transformed video data as a sequence of fixed length symbols such that respective beginnings of at least some of said plurality of corresponding blocks of transformed video data correspond with the beginnings of respective symbols within said sequence of fixed length symbols;
  address means for including an address within said sequence of fixed length symbols at a position in association with one of said plurality of corresponding blocks of transformed video data, said address indicating a position of one of said at least some of said plurality of corresponding blocks of transformed video data within the next of said fixed length symbols in said sequence following said one of the plurality of corresponding blocks of transformed video data with which said position of the address is associated; and error correction encoding means for providing error correction codes within said sequence of fixed length symbols for said plurality of corresponding blocks of transformed video data.

22. The apparatus of claim 21, wherein the sequencing means is operative to arrange a first macro block comprising at least two of said plurality of corresponding blocks of transformed video data as a first group of said sequence of fixed length symbols such that the beginning of a first one of said at least two of said plurality of corresponding blocks of transformed video data corresponds with the beginning of a respective first symbol within said sequence of fixed length symbols, said sequencing means being further operative to arrange a second macro block comprising at least two of said plurality of corresponding blocks of transformed video data as a second group of said sequence of fixed length symbols following said first group of said sequence of fixed length symbols such that the beginning of a first one of said at least two of said plurality of corresponding blocks of transformed video data of said second macro block corresponds with the beginning of a respective second symbol within said sequence of fixed length symbols.

23. The apparatus of claim 22, wherein the address means is operative to include said address within said first group of said sequence of fixed length symbols indicating a location of the beginning of the first one of the at least two blocks of said second macro block.

24. The apparatus of claim 22, wherein the transform means is operative to provide a respective DC component and a respective plurality of AC components of each of said plurality of corresponding blocks of transformed video data, and wherein the sequencing means is operative to group the respective DC components and respective AC components of the plurality of corresponding blocks of transformed video data having corresponding frequencies together within each of the first and second macro blocks.

25. The apparatus of claim 24, wherein the sequencing means is operative to arrange the grouped respective DC components of each of the macro blocks to precede the grouped respective AC components thereof and to arrange relatively lower frequency ones of the grouped respective AC components thereof within each macro block to precede relatively higher frequency ones thereof.

26. The apparatus of claim 25, wherein the sequencing means is operative to arrange the respective AC components thereof in order of ascending frequency.

27. The apparatus of claim 22, wherein the sequencing means is operative to include luminance and color difference data for respective areas of a corresponding video screen in each of the first and second macro blocks.

28. The apparatus of claim 21, in combination with means for recording said sequence of fixed length symbols on a record medium.

29. The apparatus of claim 28, wherein the recording means is operative to record said sequence of fixed length symbols on a magnetic tape.

30. The apparatus of claim 21, in combination with means for transmitting said sequence of fixed length symbols.

* * * * *